Feb. 25, 1969   L. EMBRY   3,429,582
SLED CONVERTIBLE INTO WAGON AND OTHER DEVICES
Filed Sept. 11, 1967   Sheet 3 of 3
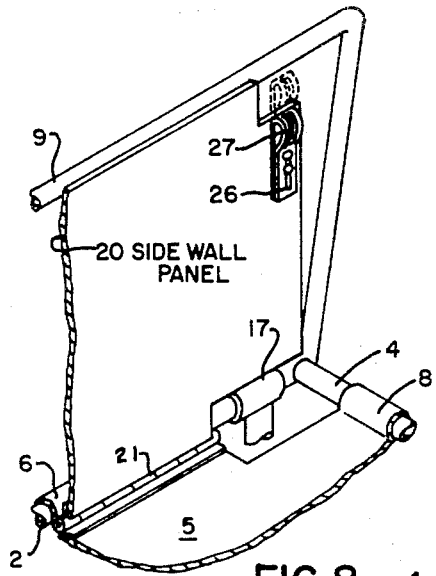
FIG.8
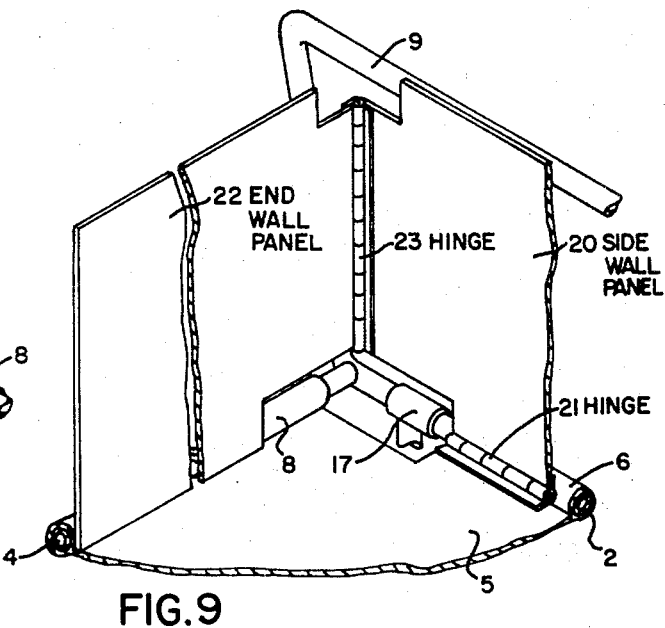
FIG.9
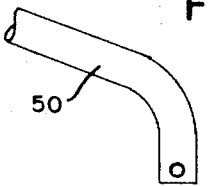
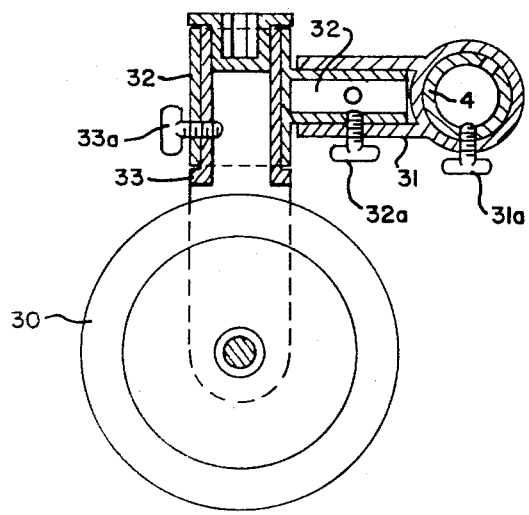
FIG.10
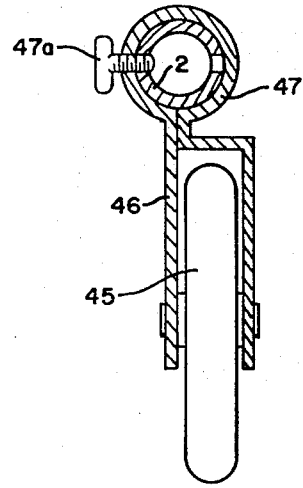
FIG.11
INVENTOR.
LOUISE EMBRY
BY Arthur H. Robert
ATTORNEY

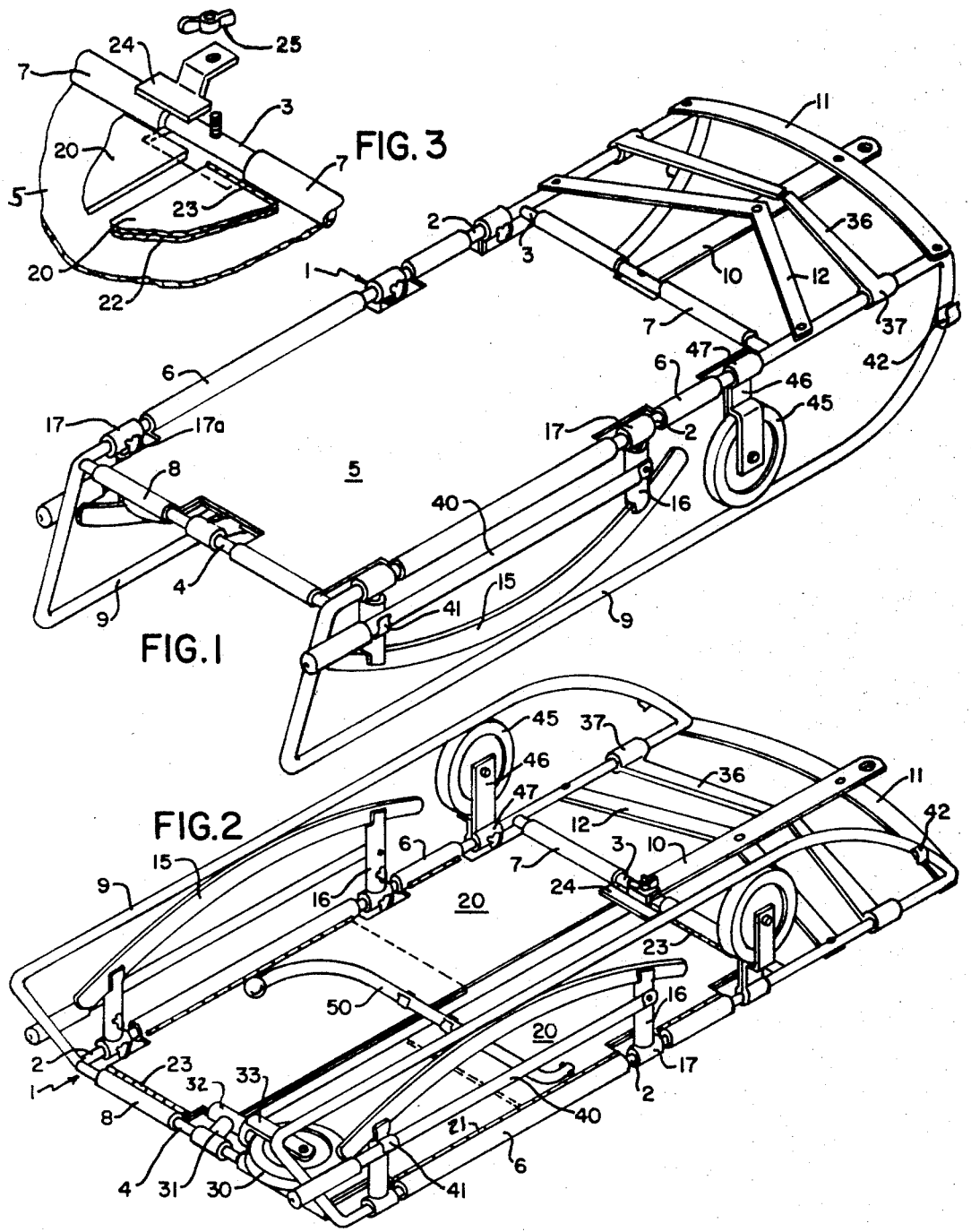

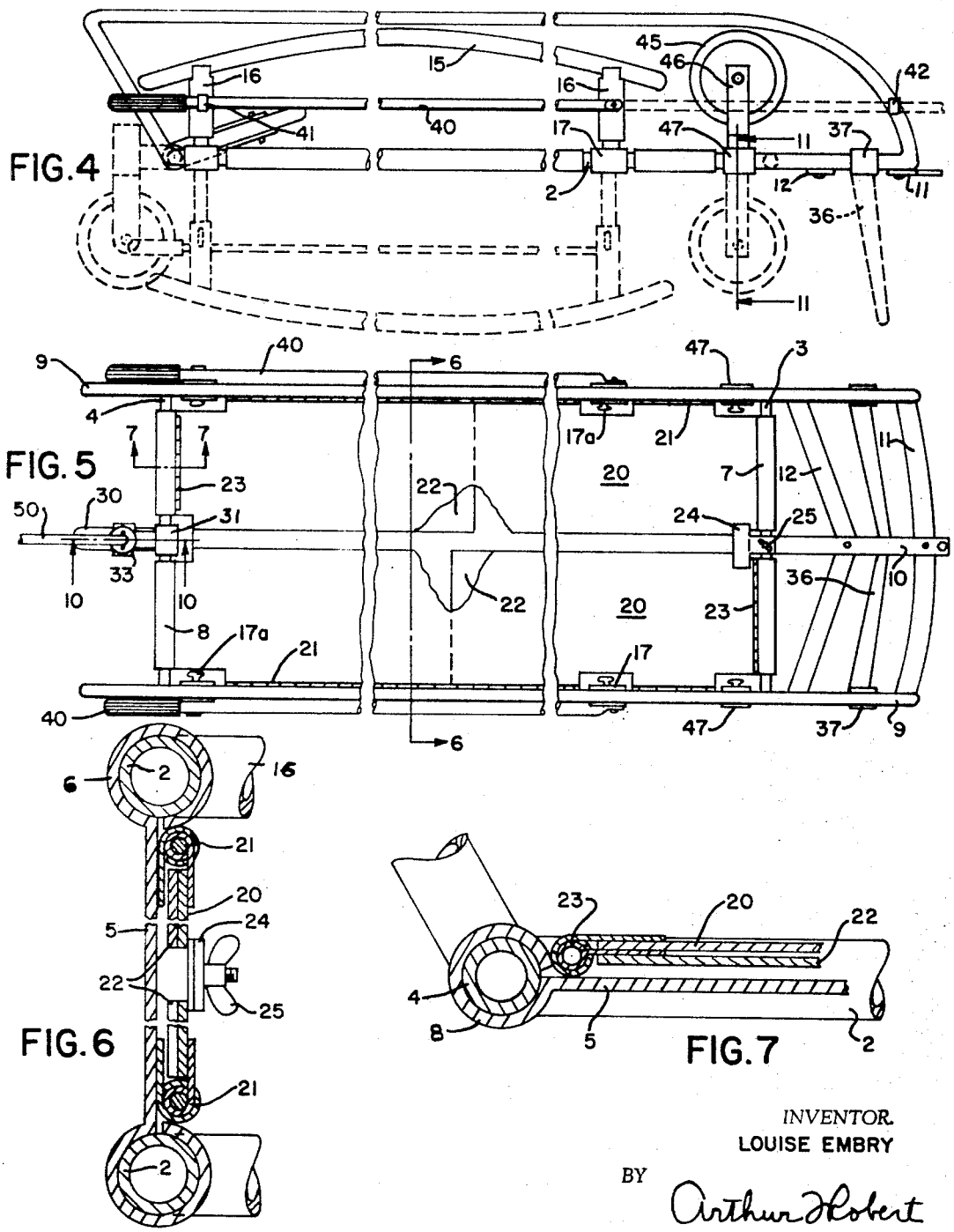

United States Patent Office 3,429,582
Patented Feb. 25, 1969

3,429,582
SLED CONVERTIBLE INTO WAGON AND
OTHER DEVICES
Louise Embry, 4799 Westside Drive,
Louisville, Ky. 40219
Filed Sept. 11, 1967, Ser. No. 666,669
U.S. Cl. 280—7.12                        4 Claims
Int. Cl. B62k 13/00

ABSTRACT OF THE DISCLOSURE

A device which is invertible from one (rightside-up) sled forming position, to another (upside-down) multi-use position in which it can be converted to form any of a number of other articles such as a rocker, wagon or wheelbarrow. This device is provided with wheel means which occupy an inoperative above-ground position when the device is used rightside-up as a sled or upside-down as a rocker. The wheel means are mounted for angular movement into an operative ground engaging position when the device is to be used upside-down as a wagon or wheelbarrow.

BACKGROUND OF THE INVENTION

Field of the invention

The present invention relates to a device which can be converted from a sled into a rocker or a wheeled device such as a wagon or wheelbarrow.

Description of the prior art

As illustrated in U.S. Patents Nos. 412,866, 863,358, 1,075,336, 1,728,587, 2,577,459 and 2,595,839, various prior art devices can be converted from a sled into a wagon and vice versa. So far as I know, most, if not all, prior art devices of this type are convertible only from a sled into a wagon and vice versa and require the wagon wheels to be taken off or put on in effecting each conversion.

SUMMARY OF THE INVENTION

Objects of the invention

The principal objects of the present invention are: to provide a device which can be converted from a sled into any of a variety of at least two other devices; and to provide a device which can be converted from a sled into any of a variety of at least two other devices, including a wheeled device, without requiring the removal or replacement of any ground-engaging device supporting member in effecting any such conversion.

Another important object of the present invention is to accomplish the foregoing objectives in a simply and sturdily constructed device which can be easily and quickly converted from one form to another.

Statement of the invention

The principal objects of my invention are largely achieved viz: (A) by constructing a rigid sled to include (1) a rectangular open perimetric frame characterized by a pair of laterally spaced horizontally elongate bed-frame members rigidly interconnected by a pair of longitudinally spaced (front and rear) cross members, (2) a flat panel member extending across the perimetric frame and secured thereto to cooperate therewith in forming a flat bed panel, and (3) a pair of horizontally elongate sled runners, one for each of said bed-frame members, each runner being spaced below, and rigidly connected to the front and rear end portions of, its bed-frame member to cooperate therewith in forming a side panel; and (B) by providing a plurality of ground-engaging device-supporting members, such as two rocker members and three wheels, each mounted on the perimetric frame for movement relative thereto from a fixed elevated inoperative position to a fixed operative vertically arranged ground-engaging position.

With this arrangement, when the sled is inverted to its multi-use position, it can be readily converted into a rocker by moving the rocker members into their operative positions or converted into a wheeled device, such as a wheelbarrow or wagon, by moving, at the very least, one wheel into its operative position for wheelbarrow-forming purposes or three wheels into their operative positions for wagon-forming purposes.

BRIEF DESCRIPTION OF THE DRAWINGS

FIG. 1 shows an invertible device constructed in accordance with the preferred form of my invention and arranged in its rightside-up sled-forming position;

FIG. 2 shows the same device when inverted to an upsidedown multiuse position in which it can be converted to form any of a number of other articles such as a rocker, wagon or wheelbarrow;

FIG. 3 is a fragmentary perspective view showing the latching mechanism used, when the sled is verted, to latch the side and end wall panels to the sled bed frame;

FIG. 4 is a side elevational view of the inverted device shown in FIG. 2, this view additionally showing in dotted lines the operative positions of the parts required to form a rocker, wagon and a wheelbarrow;

FIG. 5 is a partly broken top plan view of the inverted device as shown in FIG. 4 with all wheels down;

FIG. 6 is a vertical section through the bed of the device corresponding to one taken along line 6—6 of FIG. 5;

FIG. 7 is a fragmentary section corresponding to one taken through the bed of the device along line 7—7 of FIG. 5;

FIG. 8 is a fragmentary perspective of a back corner of the rocker's seat structure showing a side wall panel up and the back end wall panel down;

FIG. 9 is a fragmentary perspective of the other back corner of the rocker with one side wall and the adjacent end wall panel up;

FIG. 10 is a vertical section corresponding to one taken along line 10—10 of FIG. 5; and FIG. 11 is a section corresponding to one taken along line 11—11 of FIG. 4 with the wheel in the dotted line position.

DESCRIPTION OF THE PREFERRED EMBODIMENT

The preferred embodiment illustrated comprises: (A) a rigid sled invertible from a rightside-up sled-forming position to an upside-down multiuse positon; and (B) means for converting the device from a sled selectively into one or another of at least two other devices such as a rocker or a wheeled device such as a wheel-barrow or a wagon.

Rigid sled

The sled is more or less conventionally made to comprise: (A) a metal bed-frame including an open perimetric frame 1 of rectangular shape characterized by a pair of horizontally elongate bed-frame (and perimetric frame) side members 2, one at each side of the sled, and a pair of horizontal (front and rear) end bed-frame (and perimetric frame) members 3 and 4, one at each extreme end of the perimetric frame, the end members 3, 4 rigidly interconnecting the side members 2, which project forwardly (as bed-frame members) beyond that end of the perimetric frame, which corresponds to the front end of the sled; (B) a flat wood or metal panel member 5 extending across the open perimetric frame and being secured at 6 to the perimetric side members 2 and at 7, 8 to the perimetric end members 3, 4, respectively, so as to cooperate therewith in forming a flat bed panel; and (C) a pair of elongate metal sled runners 9, one for each of said bed-frame side members 2, each runner 9 being spaced below and rigidly connected (at the front and rear of the sled) to the corresponding portions of its bed-frame side member 2 to cooperate therewith in forming one side panel-like support for the sled.

The sled also conventionally includes such additional parts as: a metal draw bar 10, the "rear" end of which is secured to the center of the "front" perimetric frame end member 3; and a pair of conventional bed-frame cross members 11, 12, one cross member 11 at the extreme "front" end of the forwardly projecting side members 2 and the other cross member 12 interposed between the member 11 and the front end of the perimetric frame, each cross member (11 and 12) extending from one bed-frame side member 2 transversely over the draw bar 10 to the other side member 2 and being conventionally secured to both members 2 and to bar 10.

It will be appreciated: that the bed-frame includes the open perimetric frame 1 and all other frame parts rigidly secured to it; such as the projecting end portions of the side frame members 2 and the cross frame members 11 and 12; and that the front end of the device as a sled corresponds to the rear end of the device as a rocker, wheelbarrow and wagon.

Conversion means

The means for converting the preferred form of the device from a sled selectively into one or another of at least 3 other devices such as a rocker or wheelbarrow or wagon, comprises:

(A) A plurality of selectively operable groups of device-supporting members for supporting the different (rocker, wheelbarrow and wagon) forms of the device in its multiuse position upon the ground,
  (1) Each group including device-supporting members mounted on the bed-frame for selective manual movement on the inverted sled from a fixed inoperative position downwardly to a fixed operative vertically arranged ground-engaging position; and
(B) Means for completing the conversion of each form including
  (1) for the rocker form, side and back wall panels mounted on both side perimetric-frame members 2 for movement on the inverted sled from inoperative horizontal storage positions along the top side of the bed panel to operative arm and back supporting positions.
  (2) For the wheelbarrow form, handle means mounted on opposite sides of the device above the bed-panel of the inverted sled for movement on the inverted sled from inoperative positions in which they extend longitudinally in a direction proceeding away from the wheelbarrow wheel, and
  (3) For the wagon form, side and end wall panels mounted on the side perimetric frame members for movement on the inverted sled from inoperative horizontal storage positions along the top side of the bed panel to operative positions in which they project upwardly from both side and both end perimetric frame members.

The structure for converting the sled into a rocker will be described first, followed by successive descriptions of the structure required for wheelbarrow conversion purposes and for wagon conversion purposes.

ROCKER CONVERSION STRUCTURE

As indicated before, the rocker conversion structure comprises: a group of rocker supporting members; and means for completing the conversion of the rocker.

Group of rocker supporting members

The rocker supporting members, which cooperate (with each other and with the inverted structure of the sled) to convert the device from a sled into a rocker and to support that rocker upon the ground, comprise: (A) a pair of curved "runners" or rocker members 15, one for each side of the device; and (B) a pair of legs 16 mounting each rocker member 15 on the adjacent base-frame side member 2 for manual movement circularly about side member 2 from a fixed elevated inoperative position on the inverted sled, in which both legs 16 extend upwardly between one side member 2 and its sled runner 9 and hold the rocker member 15 slightly below the sled runner 9, to a fixed operative vertically arranged ground-engaging position (spaced 180° from its inoperative position) in which both legs extend downwardly from side member 2 and away from sled runner 9, as seen in dotted lines in FIG. 3.

One end of each rocker supporting leg 16 is rigidly connected to its rocker member 15 while its other end is (pivotally) connected at 17 to its side member 2 for pivotal movement back and forth between its operative and inoperative positions. It may be locked in each of its positions by any suitable means such as one or more set screws 17a. Thus, when both rocker members 15 assume (and are fixedly secured in) the dotted line position shown in FIG. 3, they cooperate with each other and with the inverted sled to form a rocker support.

Rocker conversion completing means

The means for completing the conversion of the preferred form of rocker, comprises: (A) a pair of side wall panels 20 pivotally mounted at 21 on opposite sides of bed panel 5 along opposite perimetric frame side members 2 for manual movement from an inoperative position, in which each panel 20 extends horizontally over the top side of the bed panel 5 of the inverted sled, angularly upward to an operative vertically arranged position, in which it extends from its side member 2 vertically upward along the inner side of the adjacent sled-supporting panel to an elevation beyond the adjacent sled runner 9; and (B) a pair of end wall panels 22, one for each side wall panel, each end panel 22 being pivotally mounted through hinge 23 to one end edge of its side wall panel 20, for manual movement (with its side wall panel 20) from an inoperative position, in which each end wall panel 22 extends horizontally between the top side of the bed panel 5 of the inverted sled and the inner wall of panel 20, 1st upwardly to the operative position of its side wall panel 20 and thence angularly and horizontally (relative to its side wall panel 20) about hinge 23 to an operative vertically arranged position, in which it extends vertically across the inverted sled from the adjacent sled-supporting panel to the opposite sled-supporting panel with its lower edge extending along the adjacent perimetric end frame member 3 or 4, as the case may be.

All of the side and end wall panels 20, 22 are latched in their inoperative positions, wherein the end wall panels are located between the bed-panel 5 of the sled and the corresponding side wall panel 20, by a latch member 24 which is pivotally mounted on the front end member 3 of the perimetric frame for movement from the latching position shown in FIG. 4, in which it is held by suitable means such as wing nut 25, to an unlatching position, say, 180° removed.

In converting to a rocker, both side panels 20 will be moved to their respective upstanding operative positions but only one end panel 22 will thereafter be horizontally swung to extend across its end of the rocker. This particular end panel, which is at the back end of the rocker, can be held in its operative back-supporting position by the latch means shown in FIG. 7.

The FIG. 7 latch means includes: a latch member 26 arranged on the inner face of side wall panel 20 (at the back end of the rocker) for slidable vertical movement over a limited range; and a pair of raised members 27 mounted on the upper end of member 26 and horizontally spaced to provide a vertical slot between them. Now when both side wall panels 20 are swung to their operative positions and the back end wall panel 22 is swung horizontally towards its end closing position, the upper corner of its free end may be latched by the raised members 27 of latch member 26. To latch the back end wall 22 in place, latch member 26 is slidably moved upwardly to the dotted line position shown in FIG. 7, next the end wall panel is moved into vertical alignment with the slot between raised members 27, and, finally, member 26 is slipped downwardly to cause raised member 27 to straddle the adjacent portion of end wall 22 and thereby latch it in place. The other end wall panel 22 of the rocker moves with its side wall panel 20 to an upright position but it will remain in that upright position (wherein it stands adjacent to its side wall panel 20) so as to leave the "front" end of the rocker open.

WHEELBARROW CONVERSION STRUCTURE

As indicated before, the wheelbarrow conversion structure also comprises: a group of wheelbarrow supporting members; and means for completing the conversion of the wheelbarrow.

Wheelbarrow group of supporting members

The wheelbarrow supporting members, which cooperate with each other and with the inverted sled to convert the device from a sled into a wheelbarrow, comprise: (A) a "wheelbarrow" supporting wheel at the rear-end of the sled; (B) means for mounting that wheel on the rear-end of the perimetric frame for manual movement from an inoperative position over the bed panel of the inverted sled to an operative ground-engaging position below the rear end of the inverted sled; (C) a pair of laterally spaced wheelbarrow supports at the front of the sled, one for each side member 2; and (D) means mounting each front wheelbarrow support on its side member 2 for movement from an inoperative above-ground position on the verted sled to a ground-engaging position on the inverted sled.

The means for mounting the "wheelbarrow" wheel 30 comprise: (A) a leg 31 pivotally mounted on the rear perimetric frame end member 4 at the center thereof; (B) a tubular T-shaped bracket 32 having its stem mounted on the outer end of leg 31 for rotation about the leg axis, the bar of the bracket having an axis at right angles to the leg axis; (C) a forked "wheelbarrow" wheel-supporting member 33 having an upper yoke or trunnion rotationally mounted in the bar of tubular T-shaped bracket 32 and terminating in a fork on which the wheel 30 is rotationally mounted; and (D) means for detachably locking or securing the leg 31 (to perimetric frame 4) in each of its 2 positions, for detachably securing the stem of tubular T-shaped bracket 32 (to leg 31) against rotation on the leg 21, and for detachably securing the forked wheel-supporting member 33 (to the bar of T-shaped bracket 32) against rotation about the bar axis of bracket 32, said locking and securing means including one or more set screws such as 31a, 32a and 33a.

The wheelbarrow supporting means at the front end of the device preferably comprise: (A) a pair of legs 36, one for each side member 2; and (B) means 37 mounting each leg 36 on its side member 2 for movement from an inoperative position, in which it extends laterally inward and terminates adjacent to and under the draw bar 10 on the inverted sled, to a fixed operative position, in which it extends downwardly from the side members 2 into engagement with the ground. Set screw or like means may be used to hold each leg 36 in each position.

Wheelbarrow conversion completing means

The means for completing the conversion of the preferred form of wheelbarrow includes: (A) a pair of handles 40, one for each side of the device, each handle 40, being secured to the corresponding rocker-member supporting-leg 16 nearest the front end of the perimetric frame for movement from a rearwardly extending inoperative position, in which its rear end is detachably supported on the other rocker-member supporting-leg 16 by a clip 41, to an operative position in which it extends forwardly toward the front end of the sled with its forward end detachably secured to a clip 42 on the front end of the sled runner 9; and (B) the side and end wall panels 20, 22 with their associated parts 21, 23–27.

WAGON CONVERSION MEANS

As indicated previously, the wagon conversion means comprise: (A) a group of wagon supporting members; and (B) means for completing the conversion of the wagon.

Wagon group of supporting members

The wagon supporting members, which cooperate with each other and with the inverted structure of the sled to convert the device from a sled into a wagon, comprise: (A) the "wheelbarrow" wheel 30 and its associated parts 31–33; (B) a pair of wheels 45 at the front end of the perimetric frame, one for each side member 2; (C) a supporting leg 46 for each wheel 45; (D) means 47 for mounting each wheel-supporting leg on its side member 2 for manual movement from a fixed elevated position more or less within the confines of the corresponding side panel of the inverted sled to a fixed operative vertically arranged position, in which the wheels 45 engage the ground; and (E) means for detachably locking each leg 46 in each of its positions, such means including one or more set screws 47a.

Wagon conversion completing means

The wagon additionally includes: side and end wall panels and associated parts 20–27; and a handle 50 which may be pivotally secured to the forked wheel support 33 of the "wheelbarrow" wheel 30, in which event, the set screw connection 33a, which fixes the wheel-support 33 nonrotationally to the tubular bracket 32, is loosened or removed to permit such rotation.

OPERATION

Since the operation of the foregoing structure should now be clear, it should suffice to say: that, when the device is used as a sled, all of the other multiuse conversion parts are secured in their respective inoperative position; that, when used as a rocker, both rocker members 15 are swung 180° from their inoperative postions, both side panels 20 (with their attached end panels 22) are raised to their vertical positions and one end panel 22 is swung horizontally to its back-supporting position; that, when used as a wheelbarrow, supporting wheel 30 is, and supporting legs 36 are, swung to their operative positions, both side panels 20 are raised to their vertical positions and either one end panel (corresponding to wheelbarrow wheel 30) is, or both end panels are, swung horizontally to close one or both ends of the wheelbarrow, and the wheelbarrow handles 40 are swung to their operative longitudinally projecting positions; and that, when used as a wagon, all three wheels (30 and 45) are swung to their ground engaging positions, both side panels 20 are raised and then both end panels 22 are horizontally swung to their end closing positions and the wagon handle 50 is attached to the upper end of the wheelbarrow wheel fork 33. Naturally, in moving any of these parts out of their inoperative position, the lock or latch, which holds them in their inoperative position, must be unloosened to permit the movement and then retightened.

While the preferred form of wheelbarrow uses a pair of legs 36, it may either: omit such legs and use the wagon wheels 45 as legs; or, omit the wagon wheels 45 and provide the wheelbarrow legs 36 with wheels for wheelbarrow and wagon supporting purposes.

My convertible device provides a single unit which enables a child to have the full enjoyment of (and the exercise that goes with) a sled, rocker and cradle, wagon and wheelbarrow. In use or in storage, this device takes up the same amount of space; hence, it is particularly suited for use by a child living in cramped quarters although not restricted to such use. It has the advantage of being easily and quickly converted from one form to another.

Having described my invention, I claim:

1. A convertible device, comprising:
   (A) a rigid sled invertible from a right-side up sled-forming position to an upside-down multiuse position, said verted sled having
      (1) a bed frame characterized by a rectangular, open, perimetric frame composed of a pair of laterally spaced horizontally elongated side frame members rigidly interconnected by a pair of end members,
      (2) a horizontal bed panel extending across the opening of the perimetric frame and supported thereby, and
      (3) a pair of sled runners, one spaced below each side frame member and secured thereto; and
   (B) means for selectively converting the sled into a wagon or wheelbarrow, said converting means including, when the sled is inverted,
      (1) a wagon and wheelbarrow wheel mounted on one end of the perimetric bed frame for manual movement from an inoperative position on and adjacent to one side of the bed panel to an operative ground-engaging position spaced from the other side of the bed panel,
      (2) one pair of wagon-supporting members mounted on opposite sides of the perimetric bed frame near the other end of said bed frame for manual movement from an inoperative position spaced from the ground to an operative ground-engaging position, and
      (3) one pair of wheelbarrow-supporting members mounted on opposite sides of the bed frame near the said other end thereof for manual movement from an inoperative position spaced from the ground to an operative ground-engaging position.

2. The device of claim 1 wherein said conversion means includes:
   (A) wheels as said wagon supporting means,
   (B) legs as said wheelbarrow supporting means, and
   (C) a pair of wheelbarrow handles, one for each side of the device, each handle being mounted on the adjacent outer vertical side of the sled between the sled runner and the adjacent side of the bed frame for manual movement from an inoperative position in which it extends rearwardly of the device as a sled to an operative position in which it extends toward and projects beyond the opposite end of the device.

3. The device of claim 1 including, when the sled is inverted:
   (A) a pair of side wall panels, one for each side of the device, each panel being pivoted to the bed panel for movement from an inoperative position, wherein the side wall panel extends over the adjacent half of the bed panel, to an operative position, wherein the side wall panel extends upwardly from along the outer margin of the bed panel; and
   (B) at least one end panel mounted on the device for movement from an inoperative position, in which it extends over and close to the bed panel, to an operative position in which it extends across one end of the device from a point adjacent the end of one side wall panel to a point adjacent the corresponding end of the opposite side wall panel.

4. The device of claim 1, which is also arranged for selective conversion from a sled into a rocker, including:
   (A) a pair of rocker members, one for each side of the device,
      (1) each rocker member being mounted on its side of the bed panel for manual movement from an inoperative position, wherein it extends between the sled runner and one side of said bed panel, to an operative position wherein it extends from the opposite side of said bed panel vertically into ground-engagement.

References Cited

UNITED STATES PATENTS

| | | | |
|---|---|---|---|
| 412,866 | 10/1889 | Whitney | 280—8 |
| 474,641 | 5/1892 | Lotinga | 280—47.18 |
| 863,358 | 8/1907 | Chalfant | 280—8 |
| 1,075,336 | 10/1913 | Custer | 280—8 |
| 1,312,444 | 8/1919 | Jackson | 280—8 |
| 1,728,587 | 9/1929 | Aldridge | 280—8 |
| 2,468,271 | 4/1949 | Ostby | 280—11 |
| 2,518,032 | 8/1950 | Lewis | 280—7.17 |
| 2,577,459 | 12/1951 | Gellenbeck | 280—8 |
| 2,595,839 | 5/1952 | Gellenbeck | 280—7.12 |

FOREIGN PATENTS

| | | |
|---|---|---|
| 1,002,292 | 10/1951 | France. |
| 214,069 | 7/1941 | Switzerland. |

LEO FRIAGLIA, *Primary Examiner.*

MILTON L. SMITH, *Assistant Examiner.*

U.S. Cl. X.R.

280—47.18, 9